April 14, 1964   W. S. FORSYTH ETAL   3,128,644
METHOD FOR MAKING CUTTING COMPONENTS FOR
HARVESTING MACHINE CUTTING MECHANISMS
Filed Oct. 17, 1960                    2 Sheets-Sheet 1
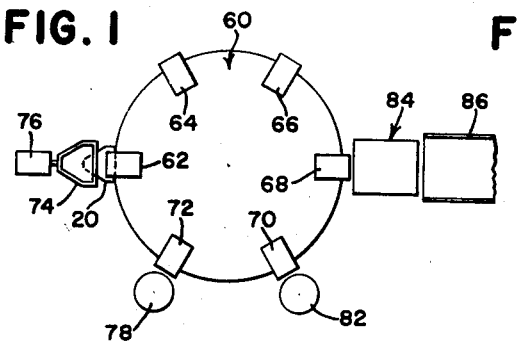
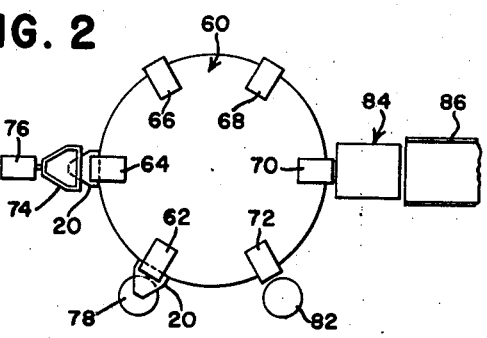
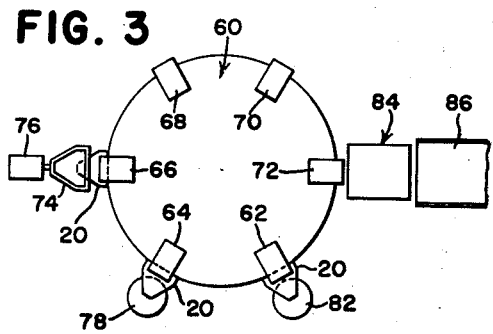
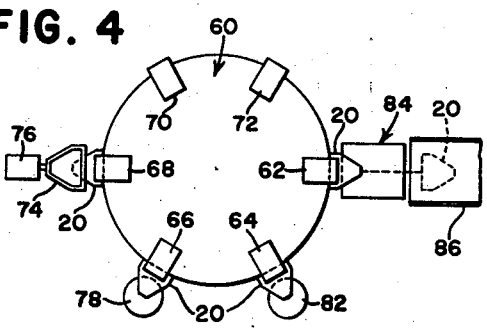
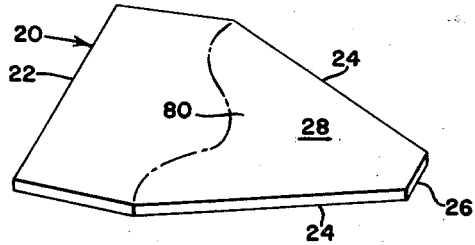
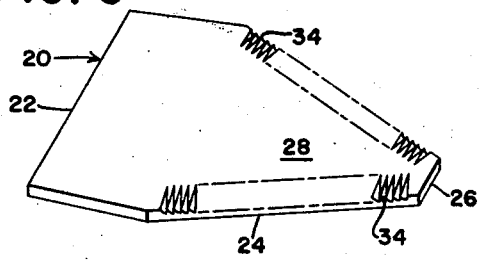
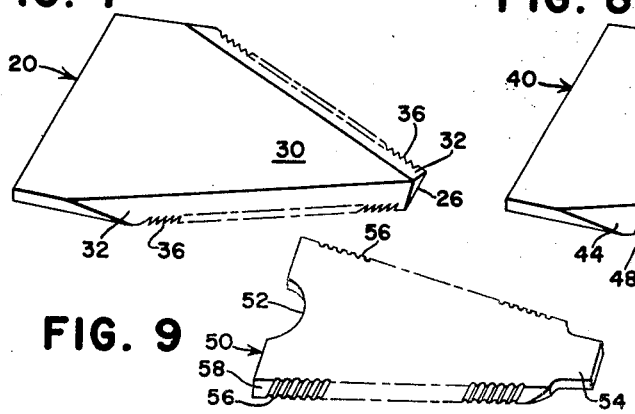
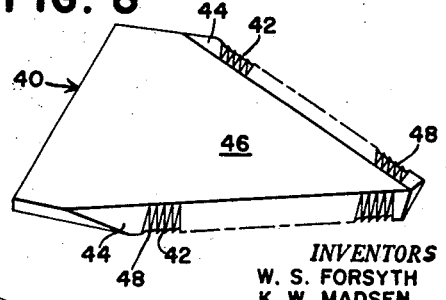
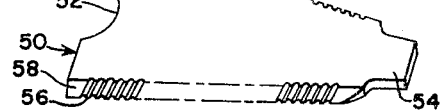
INVENTORS
W. S. FORSYTH
K. W. MADSEN April 14, 1964

W. S. FORSYTH ETAL 3,128,644
METHOD FOR MAKING CUTTING COMPONENTS FOR
HARVESTING MACHINE CUTTING MECHANISMS

Filed Oct. 17, 1960 2 Sheets-Sheet 2

*INVENTORS*
W. S. FORSYTH
K. W. MADSEN

United States Patent Office 3,128,644
Patented Apr. 14, 1964

3,128,644
METHOD FOR MAKING CUTTING COMPONENTS FOR HARVESTING MACHINE CUTTING MECHANISMS
William S. Forsyth, Moline, Ill., and Kenneth W. Madsen, Davenport, Iowa, assignors to Deere & Company, Moline, Ill., a corporation of Delaware
Filed Oct. 17, 1960, Ser. No. 62,979
6 Claims. (Cl. 76—89.1)

This invention relates to the art of cutting mechanisms for harvesting machines, typical of which are mowers, windrowers and the like.

In a typical cutting mechanism, an elongated cutter bar carries for reciprocation thereon a knife made up of a plurality of generally triangular sections which cooperate with a like plurality of guards or fingers. Each of the guards has at its upper surface what is known as a ledger plate across which the associated knife section reciprocates to function in a shearing manner to cut standing crop. Representative disclosures along these lines appear in U.S. Patents to Coultas, 2,203,982, and Borkhuis, 1,650,861.

It is known that the cutting action will be improved by the provision on the sections and the ledger plates of serrations or teeth which run transversely to and intersect the cutting edge, giving each cutting edge a generally saw-tooth appearance. In some cases, the serrations are formed in the upper or beveled surface of the cutting edge, and components of this character are known as "over-serrated." In other instances, the serrations are formed on the side opposite that which has the beveled cutting edges, and these are known as "under-serrated." In the case of the ledger plate, the teeth are customarily formed on the beveled edges.

It has been common practice to make these cutting sections by cutting them to form out of a steel strip or the like, so that each section initially assumes the form of a generally triangular plate having convergent edges. In the case of the over-serrated section, the edges are ground to provide bevels thereon and these are subsequently serrated by a process involving a rapidly vibrating chisel. In the case of the under-serrated sections, the vibrating chisel is used at the side opposite that at which the bevels are formed. Similar processes are used in the forming of ledger plates. After the forming of the serrations, the sections or similar components must be heat-treated to harden the cutting edges. It will be seen that this process is characterized by a plurality of separate operations requiring extensive handling of the individual components.

According to the present invention, an improved method is provided which features, first, the use of a die having teeth therein whereby the serrations may be formed simultaneously in both of the cutting edges or surface portions bordering those edges, and, second, a process in which the sections are heated prior to the serrating operation and subsequently quenched, thereby combining two operations in one and eliminating one handling step. In the formation of the over-serrated sections, it is a feature of the invention to provide a method whereby the serrations and the bevel may be formed simultaneously.

The foregoing and other important objects and desirable features inherent and encompassed by the invention will become apparent as preferred embodiments thereof are disclosed in detail in the ensuing description and accompanying sheets of drawings, the figures of which are described below.

FIG. 1 is a generally schematic view of the apparatus, illustrating a knife section being received from a magazine or the like preparatory to passing through its subsequent stages.

FIG. 2 is a similar view showing a subsequent stage in which the received knife section is being heated while a second knife section is being received.

FIG. 3 is a similar view showing a subsequent stage in which the first knife section is heated again as part of the process.

FIG. 4 illustrates that stage of the process in which the heated knife section is subjected to the serrating die and subsequently ejected to the quenching step.

FIG. 5 is an enlarged perspective of a section blank before being serrated.

FIG. 6 illustrates a section of the under-serrated type, as seen from one surface thereof and before the grinding operation is performed.

FIG. 7 shows the opposite side of the section of FIG. 6 after the grinding operation has been performed.

FIG. 8 shows a finished section of the over-serrated type.

FIG. 9 is a perspective view of a typical ledger plate.

Figure 10:
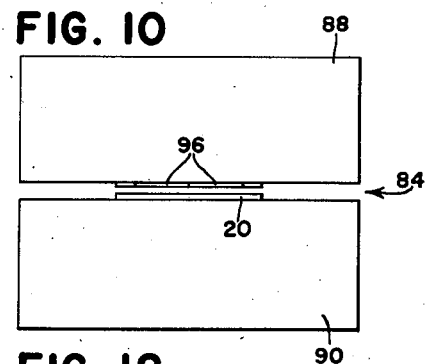
FIG. 10 is an end view of a typical die shown in its open position to receive a knife section.
Figure 11:
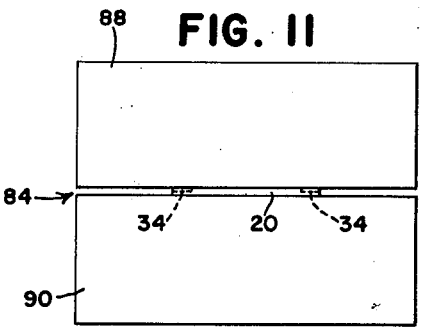
FIG. 11 shows the die closed in its serration-performing condition.
Figure 12:
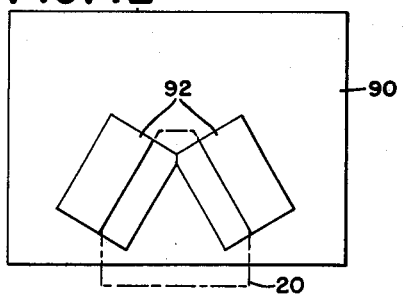
FIG. 12 is a plan of the bottom part of the die.
Figure 13:
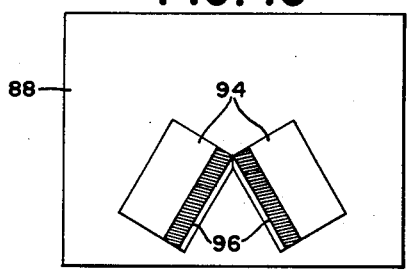
FIG. 13 is a bottom view of the top part of the die.

Reference will be had first to FIGS. 5, 6, and 7 to describe generally the construction and ultimate condition of a typical knife section of the under-serrated type. The knife section is indicated in its entirety by the numeral 20 as being initially formed in any conventional manner, as by being cut from a steel strip of the required thickness. The section is of generally triangular shape, having a back or base edge 22, and a pair of forwardly converging edges 24 which meet at a transverse front edge 26 resulting from truncation of the apex of the triangle. The section, being flat, has opposite flat surfaces 28 and 30 (see FIG. 7, which is inverted as respects FIGS. 5 and 6).

As best seen in FIG. 7, which shows the completed under-serrated section, the surface 30 is ground along the edges 24 to provide a pair of corresponding bevels 32 and respectively opposed portions at the opposite surface 28 are serrated or provided with a plurality of teeth 34. These teeth run generally transverse to the edges 24 and intersect these edges in the plane of the surface 28 after the bevels 32 are formed so that each cutting edge is in the nature of a saw-tooth edge designated in FIG. 7 by the numeral 36.

FIG. 8 indicates a section 40 of the over-serrated type. This begins initially as a blank such as that shown in FIG. 5, but the teeth or serrations 42 are formed in such manner as to exist in bevels 44 preliminarily or, preferably, simultaneously formed during the serration-forming operation. In other words, the teeth or serrations 42 are exposed at the upper surface 46 of the section 40, as distinguished from the formation of the teeth or serrations 34 at the under surface of the section shown in FIGS. 5, 6, and 7. The teeth 42 in the section 40 intersect the cutting edge in the plane of the surface opposite to the surface 46, thus again giving the cutting edge a saw-tooth effect as indicated at 48.

FIG. 9 shows a ledger plate 50 which is also generally of triangular shape, the rear edge of which is notched at 52 for mounting in a guard in conventional manner, and the forward end of which has a tang 54, also employed in the mounting thereof in the guard. The section has opposed convergent edges which are serrated respectively at 56 in such manner that the teeth or serrations exist in downwardly convergent bevels 58, it being understood that FIG. 9 shows the ledger plate from its bottom surface. When mounted on a guard, the ledger plate of FIG. 9 will be inverted so that the bevels 58 slope oppositely upwardly and outwardly. The associated knife section, sliding back and forth over the ledger plate, will thus having its cutting edges cooperating with the cutting edges of the ledger plate, functioning in generally conventional manner to cut the standing crop. It is of course understood that a typical cutting mechanism employs several knife sections and several ledger plates.

The preferred method for making the section 20 will now be described, having particular reference to FIGS. 1 through 4 and FIGS. 10 through 13. In FIGS. 1 through 4, the numeral 60 designates a suitable support or carrier, in this particular instance taking the form of a turntable rotatable about its axis. Although these views are relatively schematic, the particular details of the apparatus are not regarded as significant, since many equivalents thereof may be employed.

The turntable carries thereon a plurality of combination grippers and ejectors, in this case there being six such means 62, 64, 66, 68, 70 and 72. These are uniformly angularly spaced about the turntable 60. In the starting position of the method, the gripper 62 is presented in such fashion to receive a section 20 as from the bottom of a stack or magazine 74. Any form of ejector or feeder, illustrated schematically at 76, may be employed to move the bottom-most section 20 from the stack and into the gripper 62 in timed relation to the turntable 60, any suitable mechanism being employed to move the turntable angularly in increments according to the performance of the stages of the serrating operation.

After the gripper 62 receives a section from the magazine 74, the turntable 60 is rotated 60° (in this case) to present the section 20 to heating means 78 at what may be regarded as a first heating station. Any suitable form of heating means may be employed, sufficient to heat the section 20 in an area 80 (FIG. 5) including portions of the section bordering the convergent edges 24. Incremental angular movement of the turntable 60 is such that when the gripper 62 presents the section 20 to the heating means 78, the following gripper 64 is presented to the magazine 74 to receive another section 20 (FIG. 2).

In the practice of the present method, the section 20 held by the gripper 62 remains at the heating station 78 only a relatively brief period, following which the turntable 60 advances to the FIG. 3 stage in which the section 20 is presented to a second heating means or station 82, the turntable of course moving another 60°. At the same time, the gripper 66 is presented to the magazine 74 to receive a third section 20, and the section 20 received by the gripper 64 is presented to the heating stations 78. At this point, it should be observed that it is not absolutely necessary that the two heating stations be provided, provided that the timing situation is such that a sufficient interval is allowed for properly heating the section in the area or zone 80. However, the practice of the present method involves the disclosed timing so that the two heating stations are required to sufficiently heat the sections, which is a function of the relatively rapid advance of the turntable 60 in presenting the grippers 62–72 consecutively to the feeding and heating stations and subsequently to the die, designated in its entirety by the numeral 84. FIG. 4 shows the section 20, received by the means 62, presented to the die 84, while the subsequent grippers or means 64, 66 and 68 are presented respectively to the heating station 82, heating station 78 and magazine 74.

As previously described, the means 62 is a combination gripper and ejector and after operation of the die 84 to form the serrations 34 in the section 20, the ejector phase of the means 62 is operated to cause the now serrated section to be ejected from the die into a quenching stage, represented generally by the numeral 86.

The mechanism used for rotating the turntable 60 in timed releation to the actuation of the feeding, heating and serration-forming stages may be of any suitable character, preferably employing a combination of electric hydraulic means. However, as already indicated, these details are releatively unimportant and, on the basis of the present disclouse, any other suitable apparatus could be employed.

The presently preferred method operates to form serrations on the section 20, which is typically formed of hot-rolled carbon steel strip. The heating means 78 and 82 are designed to heat the section 20 in the area 80 above the critical point so as to effect the necessary changes for hardening. In the present case, the temperature will be 1900° F. The section is of course still hot while it is subjected to the die 84 and after being ejected from the die into the quenching stage 86 its hardness is on the order of 65 Rockwell. In the case of the under-serrated section, a grinding operation is subsequently performed to provide the bevel 32, the grinding operation preferably being performed after the section is drawn back to approximately 50–60 Rockwell. Thus, it will be seen that the method combines two operations: heating of the section and serrating same while in its heated condition. Moreover, the serration-forming operation is accomplished by the die 84 so that the serrations 34 are formed simultaneously along both edges 24.

A preferred form of die is shown generally in FIGS. 10 through 13 as including upper and lower parts 88 and 90, respectively. The lower part may be in the form of a steel block having a pair of hardened inserts 92 which in the case of the under-serrated section 20 serve as an anvil for supporting the section 20 on its top surface 30. The upper part 88 may also be a steel block having hardened inserts 94 which are respectively formed with a pair of convergent rows or series of serration-forming teeth 96 conforming in location and pattern to the convergent edges 24 on the section. Any appropriate means may be used for accurately guiding the two die parts 88 and 90 in their relative movement toward and away from each other. In the preferred practice, the bottom die part 90 is fixed and the upper part 88 is mounted for vertical movement. When one of the grippers 62–72 presents its section 20 to the die 84, the die parts are open as shown in FIG. 10, and the timing of the operation of the apparatus is such that the die rapidly closes to the position of FIG. 11 and then reopens, the serrations 34 being of course performed when the die parts moved to closed condition, following which the serrated section 20 is ejected to the quench means or stage 86.

Figure 14:
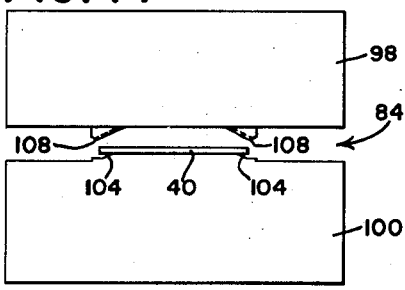
FIG. 14 is an end view of an open die of the type used in forming a section of the over-serrated type.
Figure 15:
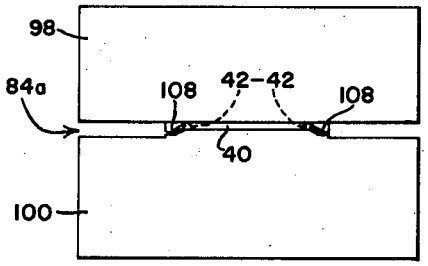
FIG. 15 shows the die in its closed position.
Figure 16:
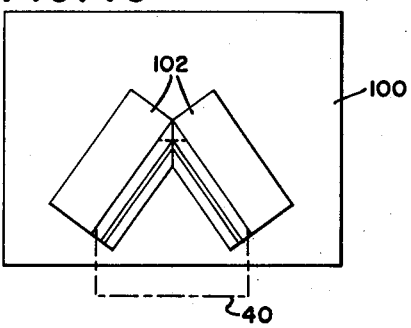
FIG. 16 is a plan of the bottom part of the die of FIGS. 14 and 15.
Figure 17:
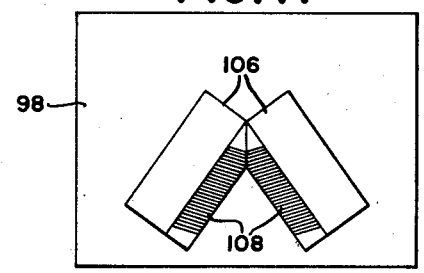
FIG. 17 is a bottom view of the top part of the die of FIGS. 14 and 15.

The serration-performing operation on the section 40 will follow the pattern previously described, with the exception that this section is of the over-serrated type and consequently employs a modified form of die indicated in its entirety by the numeral 84a and shown in FIGS. 14 through 17 as including upper and lower die parts 98 and 100 having generally the same characteristics as the die 84 but provided with modified means for accomplishing the serrations and bevels at the same time. The lower die part 100 has a pair of hardened inserts 102 which present an anvil bordered at convergent opposite edges by beveled portions 104 so that corresponding opposite edge portions of the section 40 slightly overhang the edges 104. The upper die part has a pair of inserts 106 formed with convergent rows of teeth or equivalent serration-forming means 108, but in this case, as best seen in FIGS. 14 and 15, each row of teeth is disposed in a plane at an angle to the top surface of the section 40, and the planes of these rows of teeth converge upwardly and away from the surface 40 (in a case in which the sections are handled in a horizontal plane). Consequently, when the die part 98 is moved downwardly onto the lower die part 100, the teeth 108 form the serrations 42 and the bevels 43 at the same time.

The serrating of the ledger plate 50 (FIG. 9) will follow generally the pattern employed in forming the serrations on the section 40, since the ledger plate 50 and section 40 have in common the characteristic that they are overserrated.

As a variation on the method of FIGS. 14 through 17, for making the serrations in the section 40 and ledger plate 50, the section or plate could be preliminarily beveled and the die modified so as to form the serrations in the preliminarily formed bevels. In any event, the method will employ the feature of forming the serrations simultaneously while the section is in a heated condition, as distinguished from the formation of the serrations in relatively individual fashion as in the prior art.

Features and advantages other than those enumerated will readily occur to those versed in the art, as will many modifications and alterations in the preferred embodiments of the invention disclosed, all of which may be achieved without departure from the spirit and scope of the invention.

What is claimed is:

1. The method of serrating a harvesting machine cutting element formed of flat steel material having opposite surfaces and of generally triangular shape having a pair of convergent shearing edges comprising, heating the element in portions thereof respectively along said edges, and serrating the heated element simultaneously in both of said portions to provide along each edge and in one surface thereof a series of serrations crosswise of said edge.

2. The method of claim 1, plus the further step of quenching the serrated element to harden same along said serrated edges.

3. The method of claim 1, plus the additional step of forming on the element at the opposite surface thereof a pair of outwardly sloping bevels respectively generally coincident with the serrated edges so that each bevel intersects the serrations at the outermost margin of the respective edge.

4. The method of serrating a harvesting machine cutting element formed of flat steel material having opposite surfaces and of generally triangular shape having a pair of convergent shearing edges comprising, heating the element in portions thereof respectively along said edges, placing the heated element in a die having therein serration-forming means including a pair of convergent rows of teeth pointing toward one surface of the element and arranged to correspond respectively with the heated portions of the element, and operating the die to press said teeth simultaneously into the respective heated portions to provide along each edge and in one surface thereof a series of serrations cross-wise of said edge.

5. The method of claim 4, plus the further step of quenching the serrated element to harden same along said serrated edges.

6. The method of serrating a harvesting machine cutting element formed of flat steel material having opposite surfaces and of generally triangular shape having a pair of convergent shearing edges comprising, heating the element in portions thereof respectively along said edges, placing the heated element in a die having therein serration-forming means including a pair of convergent rows of teeth pointing toward one surface of the element and arranged to correspond respectively with the heated portions of the element, and further arranged to converge toward each other at equal angles to the plane of said one surface, and operating the die to press said teeth simultaneously into the respective heated portions to provide along each edge and in one surface thereof a series of serrations cross-wise of said edge.

References Cited in the file of this patent

UNITED STATES PATENTS

| | | |
|---|---|---|
| 83,736 | Simonds | Nov. 3, 1868 |
| 524,965 | Gindorff | Aug. 21, 1894 |
| 623,602 | Hannum | Apr. 25, 1899 |
| 1,998,363 | Frost | Apr. 16, 1935 |
| 2,047,300 | Warner | July 14, 1936 |

FOREIGN PATENTS

| | | |
|---|---|---|
| 195,708 | Switzerland | May 16, 1938 |
| 1,233,961 | France | Mar. 9, 1960 |